US005862063A

United States Patent [19]

Thome et al.

[11] Patent Number: 5,862,063

[45] Date of Patent: Jan. 19, 1999

[54] ENHANCED WAVETABLE PROCESSING TECHNIQUE ON A VECTOR PROCESSOR HAVING OPERAND ROUTING AND SLOT SELECTABLE OPERATIONS

[75] Inventors: Gary W. Thome, Tomball; John S. Thayer, Houston, both of Tex.

[73] Assignee: Compaq Computer Corporation, Houston, Tex.

[21] Appl. No.: 770,346

[22] Filed: Dec. 20, 1996

[51] Int. Cl.[6] .............................. G06F 7/38; G06F 17/10

[52] U.S. Cl. .................................. 364/723; 364/724.011; 364/724.1

[58] Field of Search ................................ 364/723, 724.1, 364/736.01–736.03, 750.5, 724.011

[56] References Cited

U.S. PATENT DOCUMENTS

| | | | |
|---|---|---|---|
| 5,020,014 | 5/1991 | Miller et al. | 364/723 |
| 5,175,701 | 12/1992 | Newman et al. | 364/732 |
| 5,636,153 | 6/1997 | Ikegaya et al. | 364/736.01 |
| 5,694,345 | 12/1997 | Peterson | 364/723 |

OTHER PUBLICATIONS

Heckroth, Jim, *A Tutorial on MIDI and Wavetable Music Synthesis*, Crystal Semiconductor Corporation, Nov. 1993, pp. 1–24.

Nass, Richard, Single–Chip Audio Device Handles Wavetable Synthesis, Electronic Design, Sep. 16, 1996, pp. 55, 58.

*Voice of the Computer*, Yamaha–Audio ICs, Sep. 26, 1996.

Goslin, Gregory Ray, *Implement DSP Functions in FPGAs to Reduce Cost and Boost Performance*, EDN, Oct. 10, 1996, pp. 155–164.

*Compression Technology*, MPEG OVerview, C–Cube MIcrosystems (Oct. 8, 1996), pp. 1–9.

Lee, Woobin, MPEG Compression Algorithm, ICSL, Apr. 20, 1995, 7 pages.

(List continued on next page.)

*Primary Examiner*—Tan V. Mai

*Attorney, Agent, or Firm*—Pravel, Hewitt & Kimball

[57] ABSTRACT

An apparatus and a method for massaging audio signal perform interpolation, dynamic filtering, and panning on the audio signal represented as a matrix of input values. In the interpolation process, the input values are loaded into first and second vector registers, while fractional coefficients are loaded into a third vector register. Next, the first vector register is subtracted from the second vector register. Additionally, in a single operation, the routine performs a vector multiply operation between the second and third registers and accumulates the result of the vector multiply operation in the second register. The results are saved and the process is repeated until all input values in the matrix have been processed. In the dynamic filtering process, after the data loading step, for each slot in said vector register, the routine performs a multiply operation between the filter coefficient and the slot of the vector register and accumulates the result of the multiply operation in the slot of the second register in a single clock cycle while it retains data of the remaining slots in the vector register in the same clock cycle. The results are saved and the process is repeated until all input values in the matrix have been processed. In the stretching process, after loading data in the appropriate vector register, the routine copies the content of each slot of the vector register into consecutive pair of slots on a second vector register and when the second vector register is full, copies the content of each of the remaining slots in the first vector register into consecutive pairs of slots on a third register. In the panning process, the routine performs a vector multiply operation between the first vector register and a coefficient vector register for each slot in the first vector register. This vector multiply operation is preferably a 32-bit vector multiply operation which is broken down into a low order extended precision multiply accumulate operation and a high order extended precision multiply accumulate operation.

18 Claims, 10 Drawing Sheets

OTHER PUBLICATIONS

Programmers's Reference Manual, Intel Architecture MMX™ Technology, Chapters 2–5, Intel Corp., printed Sep. 26, 1996.

Implementation of Fast Fourier Transforms on Motorola's Digital Signal processors, Motorola, Inc. (1993), pp.3–1–4–33.

The Fast Fourier Transform, McGraw Hill (1993), pp.27–54.

Kohn L., et al., *The Visual Instruction Set (VIS) in Ultra SPARC™*, IEEE (1995), pp.482–489.

Lee, Ruby B., *Realtime MPEG Video via Software Decompression on a PA–RISC Processor*, IEEE (1995), pp.186–192.

Zhou et al., *MPEG Video Decoding with the UltraSPARC Visual Instruction Set*, IEEE (1995), pp.470–474.

Papamichalis, Panos, *An Implementation of FFT, DCT, and other Transforms on the TMS320C30*, (1990), pp.53–119.

Gwennap, Linley, UltraSparc Adds Multimedia Instructions, Microprocessor Report, Dec. 5, 1994, pp.16–18.

ENHANCED WAVETABLE PROCESSING TECHNIQUE ON A VECTOR PROCESSOR HAVING OPERAND ROUTING AND SLOT SELECTABLE OPERATIONS

BACKGROUND OF THE INVENTION

1. Field of the Invention

The present invention relates to performing wavetable processing using a processor, and more specifically, to a method and an apparatus for performing wavetable processing using a vector processor with routable operands and independently selectable operations.

2. Description of the Related Art

The pursuit of higher performance has long been a defining feature of the computer and microprocessor industries. In many applications such as computer-aided design and graphics, higher performance is always needed to quickly translate users' commands into actions, thereby enhancing their productivity. Currently, the IBM PC computer architecture, based on Intel Corporation's X-86 family of processors, is an industry-standard architecture for personal computers. Because the IBM PC architecture is an industry standard, the architecture has attracted a broad array of software vendors who develop IBM PC compatible software. Furthermore, competition within the industry standard architecture has resulted in dramatic price performance improvements, thereby leading to a more rapid acceptance of computing technology by end users. Thus, the standardized nature of the IBM PC architecture has catapulted IBM PC compatible machines to a dominant market position.

The standardized nature of the IBM PC architecture is also a double-edged sword, for if the computer is not PC compatible, the sales potential for the computer becomes severely diminished. The reason for the limitation is that much of the existing software that runs on the PCs make explicit assumptions about the nature of the hardware. If the hardware provided by the computer manufacturer does not conform to those standards, these software programs will not be usable. Thus, PC system designers are constrained to evolutionary rather than revolutionary advances in the PC architecture in order to remain compatible with earlier IBM PC computers. However, it is desirable to take advantage of the semiconductor industry's ability to integrate large numbers of transistors per chip to satisfy the pent-up demand for more computing power in communication, multimedia and other consumer products.

The trend toward multimedia such as audio and image processing has increased the need for a processor capable of performing audio processing. Traditionally, the definition of multimedia on personal computers has meant the incorporation of a compact disk read-only memory (CD-ROM) drive and a sound board with frequency modulated (FM) audio synthesis. However, such simplistic definition of multimedia is being rapidly altered by advances in IC technology. Modem consumers today demand real time multimedia, requiring compression and decompression capability for streams of video as well as sound. Additionally, the multimedia systems need to generate realistic sounds on a real-time basis.

Sound is produced by vibrations called sound waves which are transmitted over a media such as air. In their natural state, sound waves are analog, which rise and fall, changing in frequency and amplitude in smooth progressions. Normally, sound waves can be represented as a collection of sine or sinusoidal waves. The sine wave is a pure tone, such that only a single note can be heard without any undertones or overtones. When a sound wave is produced repeatedly and regularly, the sound acquires a fixed pitch, just like a musical note. However, when a sound wave is an irregular pattern, it has little or no pitch and produces an irregular sound, such as a loud bang. The frequency of a sound is determined by the number of times the wave is repeated during a given period. Furthermore, pitch is determined by frequency. As frequency rises, the pitch goes higher.

Generally, most natural sounds are much more complicated than a conventional sine wave. These complications make up the timbre, or characteristic tonal quality of the sound. Timbre is made up of several elements, including the shape of the envelope of the sound wave and the complexity of the frequency pattern within the envelope. Thus, although a sound wave is fundamentally a sine wave, the representation of real sounds can be quite complex.

A number of different technologies can be used to create sounds in music synthesizers. Two widely used techniques are frequency modulation (FM) synthesis and wavetable synthesis. FM synthesis techniques generally use one periodic signal which is derived from a modulator to modulate the frequency of another signal (the carrier). If the modulating signal is in the audible range, then the result will be a significant change in the timbre of the carrier signal. FM synthesis techniques are very useful for creating expressive new synthesized sounds. However, if the goal of the synthesis system is to recreate the sound of some existing instrument, this can be done generally more accurately with digital sample-based techniques.

Digital sampling systems store high quality sound samples digitally, and then replay these sounds on demand. To capture the analog sound waves, the computer system typically employs an analog-to-digital converter (ADC), which converts the analog audio signal into digital values suitable for processing. Digital sample based synthesis systems may employ a variety of special techniques such as sample looping, pitch shifting, mathematical interpolation, and polyphonic digital filtering, to reduce the amount of memory required to store the sound samples or to obtain more types of sounds from a given amount of memory. These sample based synthesis systems are often called wavetable synthesizers because the sample memory in these systems contains a large number of sampled sound segments and can be thought of as a "table" of sound waveforms, which may be looked up and then utilized when needed. Thus, the term wavetable synthesis is used to describe this audio generation technology.

Typically, in a wavetable synthesis system, the sample data is edited and processed before they become sample sounds suitable for use in the wavetable synthesis system. The requirements for editing the original sample data identifies and extracts the initial and looped segments, and further resamples the data if necessary to obtain a pitch period length that is an integer multiple of the sampling. When all the sample processing has been completed, the resulting sample sound sequence for the various instruments are tabulated to form the sample memory for the synthesizer.

To maximize memory utilization, one primary technique used in wavetable synthesizers to conserve sample memory space is the looping of sample sound segments. For a large number of instrument sounds, the sound can be modeled as consisting of two major section: an attack section and a sustain section. The attack section is the initial part of the sound, where the amplitude and the spectral characteristics of the sound may be changing very rapidly. The sustain section of the sound follows the attack section, with the characteristics of the sound changing less dynamically. Consequently, a great deal of memory can be save in a wavetable synthesis system by storing only a short segment of the sustain section of the waveform, and then looping the segment during playback.

Although the sample memory could simply be indexed to using a sample memory address pointer which is incremented using an integer number of samples, this setup allows only a limited set of pitch shifts. To provide a greater range of pitch shifts, the memory pointer is provided with an integer part and a fractional part such that the increment value could be a fractional number of samples. The integer part of the address pointer is used to address the sample memory while the fractional part is used to maintain the frequency accuracy. In such an arrangement, when non-integer increment values are utilized, the frequency resolution for playback is determined by the number of bits used to represent the fractional part of the address pointer and the address increment parameter.

When the fractional part of the address pointer is non-zero, then the desired value falls between available data samples. A number of interpolation approaches can be used. The solution might be as simple as ignoring the fractional part of the address. However, such solution limits the pitch range of the synthesizer. A slightly better approach would be to use the nearest available sample value. The more sophisticated system performs interpolation between available data points in order to obtain a value to be used during playback. These systems interpolate between two points A and B, with fractional value X, using the equation:

$$Vx=A+X(B-A)$$

As can be seen, each interpolation requires an addition operation, a multiply operation and a subtract operation, not counting the data load operations which can add as many as three operations to the total computational complexity.

In addition to the interpolation, an envelope generator function is provided to create an envelope appropriate for the particular instrument. The envelope generator controls the shape-the rate of the attack, decays, sustain, and release. For many acoustic instruments, the character of the tone which is produced changes as a function of the amplitude level at which the instrument is played. Hence, velocity splits which utilize different sample segments for different note velocities can be implemented to simulate this phenomena. Alternatively, a digital low pass filter for each note with a cutoff frequency which varies as a function of the note velocity can be implemented to dynamically adjust the output frequency spectrum of the synthesized sound as a function of the note velocity. This solution allows a very effective recreation of the acoustic instrument timbre. Filtering operation can also be used to help eliminate noise which generated during the pitch shifting process.

One barrier to providing high fidelity multimedia audio is the available processing power of the computer. High fidelity audio boards such as Sound Blaster Pro boards can sample at rates as high as 44,000 times a second. Even at more typical sampling rates of 16,000 times a second, a stereo sampler can capture as much as 32,000 16-bit samples in a second. The interpolation of each sample requires an addition, a subtraction, a multiplication, and three load operations and thus can add about 200,000 extra operations per second for each sample point to the processing load. This rather significant processing load is incremental to existing load on the processor. Additionally, this increases with multiple instruments, or voices. Twenty-four instruments is common, thus requiring 32,000×24 samples/second. Further, the interpolation process requires 32-bit multiply operations to preserve the fidelity of the interpolated sound. Additionally, since sound has to be generated continuously, sufficient reserve processing capacity is needed in order to manipulate or process sound in real-time.

Not surprisingly, the ability to generate quality sound once required special purpose digital signal processing (DSP) devices so that the processor could focus on solving problems on the desktop. However, as such DSP-based solutions add cost, the availability of quality multimedia audio sound has not been a standard part of today's desktop environment.

Due to cost and compatibility reasons, it is an undesirable to add a digital signal processor or a custom processor to the personal computer to perform wavetable processing. Thus, a fast and efficient apparatus and method for performing wavetable processing on a general purpose processor is desired for many applications. Furthermore, it is desirable to accelerate the speed of performing various wavetable processing operations without adversely affecting the compatibility of the personal computer with the installed software base.

SUMMARY OF THE INVENTION

An apparatus and a method for massaging audio signal performs interpolation, dynamic filtering, and panning on audio signals represented as a matrix of input values. This is achieved using a vector processing extension unit that provides routable operands and independently selectable operations. In the interpolation process, the input values are loaded into first and second vector registers, while fractional coefficients are loaded into a third vector register. Next, the first vector register is subtracted from the second vector register. Additionally, in a single operation, the routine performs a vector multiply operation between the second and third registers and accumulates the result of the vector multiply operation in the second register. The results are saved and the process is repeated until all input values in the matrix have been processed. In the dynamic filtering process, after the data loading step, for each slot in said vector register, the routine performs a multiply operation between the filter coefficient and the slot of the vector register and accumulates the result of the multiply operation in the slot of the second register in a single clock cycle while it retains data of the remaining slots in the vector register in the same clock cycle. The results are saved and the process is repeated until all input values in the matrix have been processed. In the panning process, the routine performs a vector multiply operation between the first vector register and a coefficient vector register for each slot in the first vector register. This vector multiply operation is preferably a 32-bit vector multiply operation which is broken down into a low order extended precision multiply accumulate operation and a high order extended precision multiply accumulate operation. The results are saved and the operation is repeated until all input values in the matrix have been processed.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
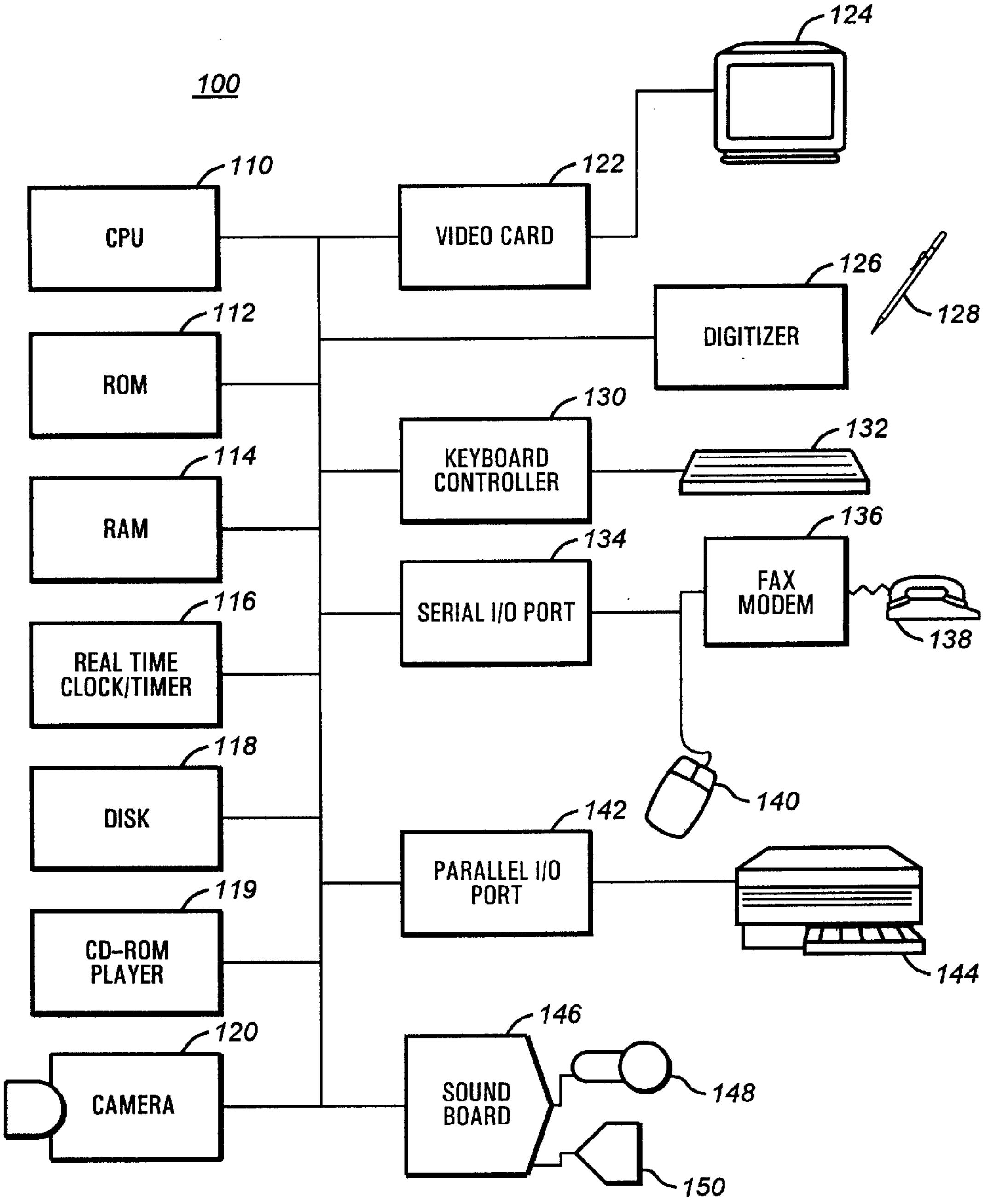
FIG. 1 is a block diagram of a computer system having a processor and a multimedia extension unit of the present invention.
Figure 2:
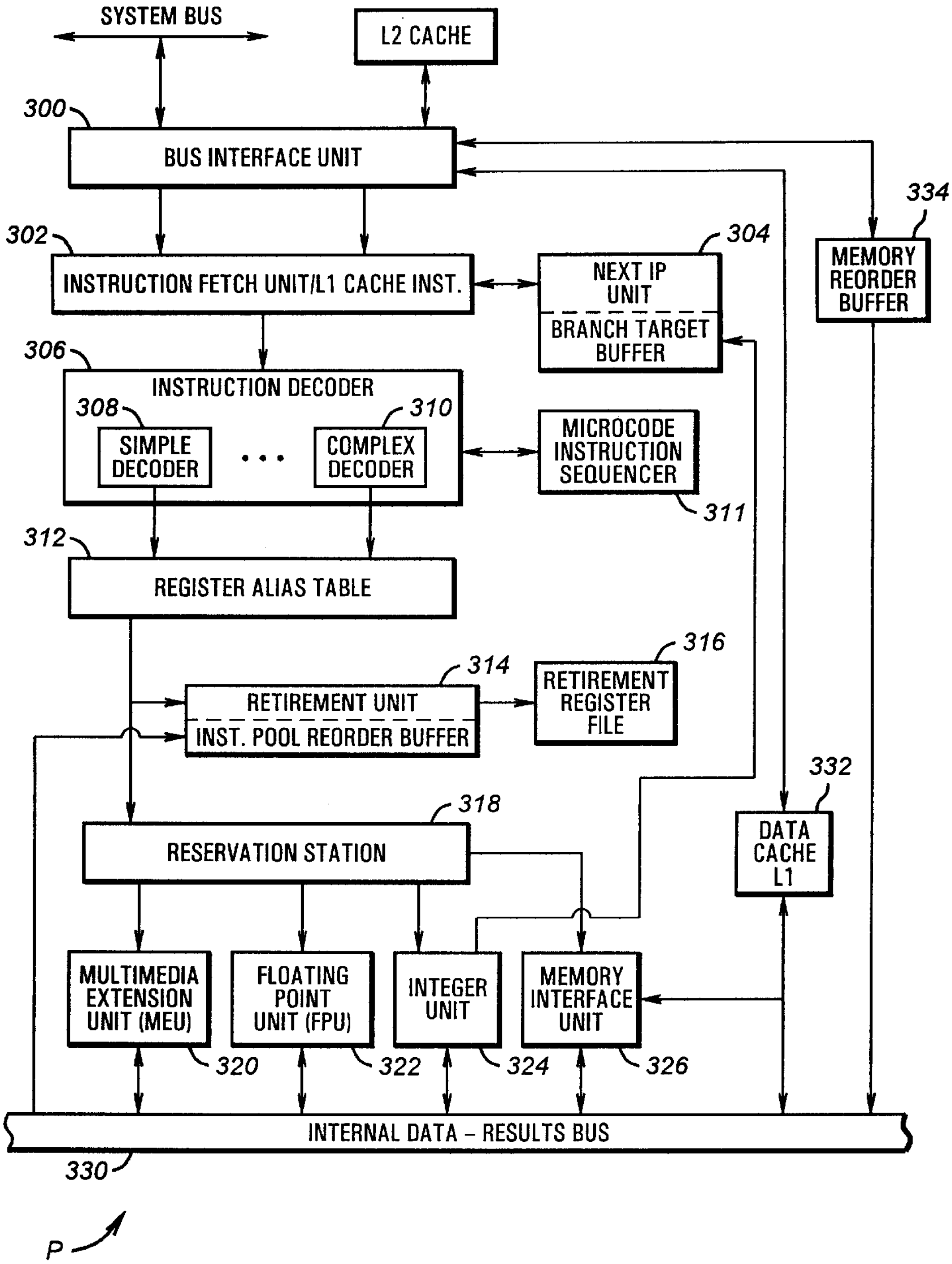
FIG. 2 shows a micro-architecture of the processor and the multimedia enhanced unit of FIG. 1.

Turning now to the drawings, FIG. 1 shows a block diagram of a computer 100. In FIG. 1, a central processing unit (CPU) 110 provides processing power for the computer system 100. The CPU 110 is preferably an Intel Pentium-Pro® processor with an multimedia extension unit (MEU), as shown in FIG. 2. However, a number of other microprocessors suitably equipped with an MEU may be used, including a PowerPC microprocessor, an R4000 microprocessor, a Sparc microprocessor, or an Alpha microprocessor, among others. The CPU 110 is connected to a read only memory (ROM) 112. The ROM 112 provides boot code such as a system BIOS software that boots up the CPU 110 and executes a power up self test (POST) on the computer system 100.

In addition, the CPU 110 is connected to a random access memory (RAM) 114. The RAM 114 allows the CPU 110 to buffer instructions as well as data in its buffer while the computer 100 is in operation. The RAM 114 is preferably a dynamic RAM array with 32 megabytes of memory. The CPU 110 is also connected to a real time clock and timer 116. The real time clock and timer 116 stores the dates and time information for the CPU 110. Furthermore, the real time clock and timer 116 has a lithium backup battery to maintain the time information even when the computer system 100 is turned off.

The CPU 110 is also connected to a disk storage device 118. The disk storage device 118 stores executable code as well as data to be provided to the CPU 110. Additionally, the CPU 110 is connected to a CD-ROM drive. Typically, an IBM PC compatible computer controls the disk drive 118 and the CD-ROM player 119 via an Intelligent Drive Electronics (IDE) interface.

Additionally, the CPU 110 is connected to a camera 120. The camera 120 supports video conferencing between the user and other users. The camera 120 essentially consists of a lens, a charge-coupled-device (CCD) array, and an analog to digital converter. The lens focuses light onto the CCD array, which generates voltages proportional to the light. The analog voltages generated by the CCD array are converted into a digital form by the analog to digital converter for processing by the CPU 110.

The CPU 110 is also connected to a video card 122. On the back of the video card 122 are one or more jacks. Connectors for monitors can be plugged into the jacks. The connectors, which are adapted to be plugged into the jacks of the video card 122, eventually are connected to the input of a monitor 124 for display.

A pen-based user interface is also provided. A digitizer 126 is connected to the CPU 110 and is adapted to capture user input. Additionally, a pen 128 is provided to allow the user to operate the computer. The pen 128 and digitizer 126 in combination supports another mode of data entry in addition to a keyboard 132.

While the video monitor 124 receives the output signals from the CPU 110 to the user, the keyboard 132 is connected to a keyboard controller 130 for providing input information to the CPU 110. Additionally, one or more serial input/output (I/O) ports 134 are provided in the computer system 100. Connected to the serial I/O ports 134 are a plurality of peripherals, including a mouse 140 and a facsimile modem 136. The facsimile modem 136 in turn is connected to a telephone unit 138 for connection to an Internet service provider 90, for example. Preferably, the modem 136 is a 28.8 kilobits per second modem (or greater) that converts information from the computer into analog signals transmitted by ordinary phone lines or plain old telephone service (POTS). Alternatively, the modem 136 could connect via an integrated service digital network (ISDN) line to transfer data at higher speeds.

Furthermore, a parallel input/output (I/O) port 142 is provided to link to other peripherals. Connected to the parallel I/O port 142 is a laser printer 144. Additionally, a microphone 148 is connected to a sound board 146 which eventually provides input to the CPU 110 for immediate processing or to a disk drive 118 for offline storage. The sound board 146 also drives a music quality speaker 150 to support the multimedia-based software. As multimedia programs use several medium, the multimedia computer system of the present invention integrates the hardware of the computer system 100 of the present invention. For example, the sound board 146 is used for sound, the monitor 124 is used to display movies and the CD-ROM player 119 is used for audio or video. In this manner, sounds, animations, and video clips are coordinated to make the computer session more friendly, usable and interesting.

Turning now to FIG. 2, a functional block diagram of the processor microarchitecture employed by the present invention is shown. The processor of the present invention is preferably based on an Intel-compatible Pentium-Pro microprocessor. The mode employed by the present invention is in addition to the existing modes of the 486 and Pentium processors, and unless otherwise indicated, the operation and features of the processors remain unchanged. Familiarity with the operation of the 486, Pentium and Pentium Pro are assumed in this description. For additional details, reference should be made to the appropriate data book. However, the invention could also be used in earlier processor generations such as the Intel Pentium™, 80486™, 80386™, 80286™, and 8086™ microprocessors. The use of the features of the multimedia extension unit could also be used with other types of microprocessors, including without limitation, the Power PC architecture, the Sparc architecture, and the MIPS R4000 architecture. For purposes of this disclosure, the terms microprocessor and processor can be used interchangeably.

In FIG. 2, the processor P employed by the present invention interacts with the system bus and the Level 2 cache (not shown) via a bus interface unit 300. The bus interface unit 300 accesses system memory through the external system bus. Preferably, the bus interface unit is a transaction oriented 64-bit bus such that each bus access handles a separate request and response operation. Thus, while the bus interface unit 300 is waiting for a response to one bus request, it can issue additional requests. The interaction with the Level 2 cache via the bus interface unit 300 is also transaction oriented. The bus interface unit 300 is connected to a combination instruction fetch unit and a Level 1 instruction cache 302. The instruction fetch unit of the combination unit 302 fetches a 32-byte cache line per clock from the instruction cache in the combination unit 302. The combination unit 302 is also connected to an instruction pointer unit and branch target buffer combination 304. The branch target buffer in turn receives exception/interrupt status and branch misprediction indications from an integer execution unit 324, as discussed below.

Additionally, the instruction fetch unit/L1cache combination 302 is connected to an instruction decoder 306. The instruction decoder 306 contains one or more simple decoders 308 and one or more complex decoders 310. Each of decoders 308 and 310 converts an instruction into one or more micro-operations ("micro-ops"). Micro-operations are primitive instructions that are executed by the processor's execution unit. Each of the micro-operations contains two logical sources and one logical destination per micro-operation.

The processor P has a plurality of general purpose internal registers which are used for actual computation, which can be either integer or floating point in nature. To allocate the internal registers, the queued micro-ops from the instruction decoder 306 are sent to a register alias table unit 312 where references to the logical register of the processor P are converted into internal physical register references. Subsequently, allocators in the register alias table unit 312 add status bits and flags to the micro-ops to prepare them for out of order execution and sends the resulting micro-ops to an instruction pool 314.

The instruction pool 314 is also connected to a reservation station 318. The reservation station 318 also receives the output of the register alias table 312. The reservation station 318 handles the scheduling and dispatching of micro-ops from the instruction pool 314. The reservation station 318 supports classic out-of-order execution where micro-ops are dispatched to the execution unit strictly according to data flow constraints and execution resource availability to optimize performance.

The reservation station 318 is in turn connected to a plurality of execution units, including a multimedia extension unit (MEU) 320, a floating point unit (FPU) 322, an integer unit (IU) 324, and a memory interface unit (MIU) 326. The MEU 320, FPU 322, IU 324 and MIU 326 are in turn connected to an internal data-results bus 330. The internal data-results bus 330 is also connected to the instruction pool 314, a Level 1 data cache 332 and a memory reorder buffer 334. Furthermore, the Level 1 data cache 332 and the memory reorder buffer 334 are connected to the bus interface unit 300 for receiving multiple memory requests via the transaction oriented bus interface unit 300. The memory reorder buffer 334 functions as a scheduling and dispatch station to track all memory requests and is able to reorder some requests to prevent data blockage and to improve throughput.

Turning now to the execution units, the memory interface unit 326 handles load and store micro-ops. Preferably, the memory interface unit 326 has two ports, allowing it to process the address on a data micro-op in parallel. In this manner, both a load and a store can be performed in one clock cycle. The integer unit 324 is an arithmetic logic unit (ALU) with an ability to detect branch mispredictions. The floating point execution units 322 are similar to those found in the Pentium processor. From an abstract architectural view, the FPU 322 is a coprocessor that operates in parallel with the integer unit 324. The FPU 322 receives its instruction from the same instruction decoder and sequencer as the integer unit 324 and shares the system bus with the integer unit 324. Other than these connections, the integer unit 324 and the floating point unit 322 operate independently and in parallel.

In the preferred embodiment, the FPU 322 data registers consist of eight 80-bit registers. Values are stored in these registers in the extended real format. The FPU 322 instructions treat the eight FPU 322 data registers as a register stack. All addressing of the data registers is relative to the register on top of the stack. The register number of the current top of stack register is stored in the top. Load operations decrement the top by one and load a value into the new top of stack register, and store operations store the value from the current top register in memory and then increment top by one. Thus, for the FPU 322, a load operation is equivalent to a push and a store operation is equivalent to a pop in the conventional stack.

Referring now to the multimedia extension unit (MEU) 320, the MEU 320 enhances the instruction set to include vector instructions, partitioned instructions operating on small data elements, saturating arithmetic, fixed binary point data, data scaling support, multimedia oriented ALU functions, and flexible operand routing. To preserve compatibility and minimize the hardware/software impact, the MEU 320 uses the same registers as the FPU 322. When new multimedia instructions are executed on the MEU 320, the registers of the FPU 322 are accessed in pairs. As the FPU 322 registers each have 80 bits of data, the pairing of the FPU 322 registers effectively creates four 160-bit wide registers, as further discussed below. Furthermore, the MEU 320 adds newly defined instructions which treat registers as vectors of small fixed point data values rather than large floating point numbers. Since the operating system saves the entire state of the FPU 322 as necessary during context switches, the operating system needs not be aware of the new functionality provided by the MEU 320 of the present invention. Although the disclosed system contemplates that the MEU 320 and the FPU 322 share logic or registers, the processor P could simply have snooping logic that maintains coherency between register values in completely separate MEU 320 and FPU 322 sections.

With respect to status and control bits, the FPU 322 has three registers for status and control: status word, control word, and tag word. These FPU 322 registers contain bits for exception flags, exception masks, condition codes, precision control, routing control and stack packs. The MEU 320 does not use or modify any of these bits except for the stack pack bits, which is modified because the MEU 320 result values are often not valid floating point numbers. Thus, anytime a MEU instruction is executed, the entire FPU tag word is set to 0xffffh, marking all FPU 322 registers as empty. In addition, the top of stack pointer in the FPU 322 status words (bits 11–13) is set to 0 to indicate an empty stack. Thus, any MEU 320 instruction effectively destroys any floating point values that may have been in the FPU 322. As the operating system saves and restores the complete FPU state for each task, the destruction of floating point values in the FPU 322 is not a problem between tasks. However, appropriate software action may need to be taken within a single task to prevent errors arising from modifications to the FPU 322 registers.

The sharing of the registers of the FPU 322 and the MEU 320 avoids adding any new software visible context, as the MEU 320 does not define any new processor status, control or condition code bits other than a global MEU extension enable bit. Furthermore, the MEU 320 can execute concurrently with existing instructions on the registers of the integer unit 324. Therefore, the CPU 110 logic is well utilized as the MEU 320 is efficiently dedicated to signal processing applications while the FPU 322 is dedicated to floating point intensive applications and the integer unit 324 handles addressing calculations and program flow control. Additionally, the MEU 320 allows for scalability and modularity, as the MEU 320 does not change the integer or load/store units. Thereby, the CPU 110 core design is not impacted when the MEU 320 is included or excluded from the processor P.

Figure 3:
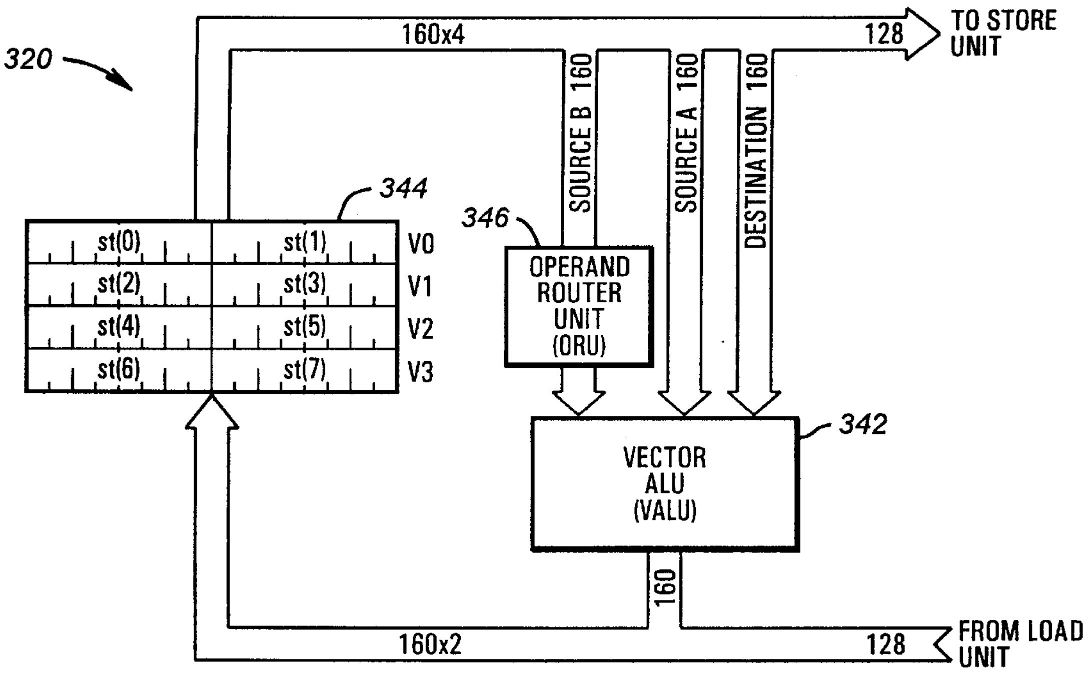
FIG. 3 is a more detailed block diagram of the multimedia extension unit of FIG. 2.

Referring now to FIG. 3, a more detailed block diagram of the MEU 320 is shown. The MEU 320 contains a vector arithmetic logic unit (VALU) 342. The VALU 342 is in turn connected to a plurality of vector registers 344, preferably four. These vector registers are preferably the same registers as those present in the FPU 322.

In the MEU 320, the FPU registers 344 are accessed in pairs. As each of the FPU 322 registers is 80 bits in width, the pairing of the FPU 322 registers effectively creates four 160-bit wide vector registers 344. Thus, as shown in FIG. 3, the register pairs of the FPU 322 are referred to as V0, V1, V2 and V3 and correspond to the physical FPU 332 registers. For instance, FPU 322 physical register 0 is the same as the lower half of the MEU 320 vector register V0. Similarly, FPU 322 physical register 1 is the same as the upper half of MEU 320 vector register V0, while the FPU 322 physical register 7 is the same as the upper half of the MEU 320 vector register V3. Furthermore, in the MEU 320 of FIG. 3, the stack based access model of the 80×87 floating point instructions is not utilized. Instead, the 160-bit registers V0–V3 are partitioned to form vectors of 10-bit or 20-bit data elements.

The output of the vector registers 344 are subsequently provided to an operand router unit (ORU) 346 and the VALU 342. Each vector instruction controls both the ORU 346 and the VALU 342. In combination, the ORU 346 and the VALU 342 allows the processor P to simultaneously execute software using flexible operand routing and multiple operation. Referring to the flow graph of FIG. 15, for example, the VALU 342 operates on the nodes and the ORU 346 implements diagonal interconnections. Thus, because vector arithmetic of different types and data movement can be processed in groups simultaneously, the VALU 342 and the ORU 346 provide high performance The VALU 342 can perform a variety of operations, including addition, subtraction, multiply, multiply/accumulate, shifting and logical functions. The VALU 342 assumes that each of the 160-bit registers 344 is partitioned into 10-bit or 20-bit source operands and destinations. Thus, the VALU 342 can execute 8 or 16 individual operations per instruction. A three-operand instruction format is supported by the VALU 342: source A, source B, and destination registers for each instruction. Additionally, certain operations, such as multiply/accumulate use the destination as an implied third source operand.

The MEU 320 operates primarily in fixed point operation. The difference between fixed point and integer data is the location of the binary point. In the MEU 320, the binary point is assumed to be to the left of the most significant bit. Numbers in the MEU 320 can be considered as fractions that nominally occupy the range from plus 1 to minus 1. The advantage of this format over the integer format is that the numerical magnitude of the data does not grow with each multiply operation as the product of two numbers in the plus 1 to minus 1 ranges yields another number in the plus 1 to the minus 1 range. Therefore, it is less likely the data will need to be rescaled.

The MEU 320 takes advantage of the full 80-bit width of the FPU 322 register set. The MEU 320 loads data from memory in 8-bit or 16-bit quantities, but the data is expanded to 10 bits or 20 bits as it is placed into the vector registers 344 (V0..V3). The extended provision provides two benefits: (1) simplifying support for signed and unsigned data; and (2) helping to avoid overflow conditions and round-off errors on intermediate results.

Furthermore, the VALU 342 performs all arithmetic operations using saturating arithmetic. Saturating arithmetic differs from the more familiar modular arithmetic when overflows occur. In modular arithmetic, a positive value that is too large to fit into destination wraps around and becomes very small in value. However, in saturating arithmetic, the maximum representable positive value is substituted for the oversized positive value. This operation is often called clipping.

Additionally, the VALU 342 performs adds, subtracts and Boolean operations on 10-bit to 20-bit quantities. If the result of an add or subtract is outside of the representable range, the result is clipped to the largest positive or negative representable value. However, Boolean operations are not clipped. Furthermore, the result of the add, subtract, and move operations may optionally be shifted right by one bit before being stored to the destination. This scaling can be used to compensate for the tendency of data magnitude to grow with each add or subtract operation. Multiply operations take two 10-bit or 20-bit signed factors and generate a 19-bit or 39-bit signed product. The least significant 9 or 19 bits of the product are rounded and dropped before stored into the 10-bit or 20-bit destination register. As simple multiply operations typically do not overflow, they do not need to be clipped. However, multiply/accumulate operations do require clipping.

Figure 4:
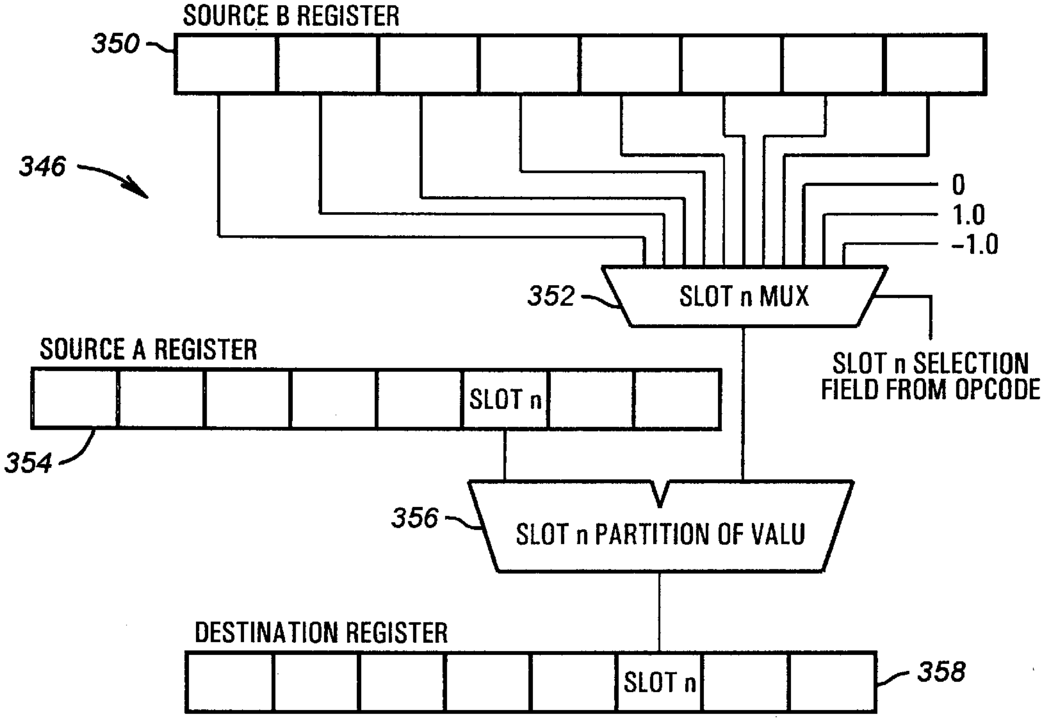
FIG. 4 shows in more detail an operand router unit of FIG. 3.

Turning now to FIG. 4, the details of the operand routing unit 346 are shown. The ORU 346 allows operands to be flexibly moved within and between large 160-bit registers. As vector processors generally must load data from memory in large monolithic chunks, the ability to route operands is useful for the MEU 320. The ability to flexibly access and route individual operands, the ORU 346 provides the ability to "swizzle" the data partitions in a vector register as data moves through it. The swizzling operation allows the operands to be shuffled as needed by the application concurrently with the execution of the vector ALU operations. Thus, a smaller amount of data is required to yield useful results. Thus, the load and store units are less likely to be overloaded, leaving greater bandwidth for the integer, non-vector units to perform work.

As shown in FIG. 4, the ORU 346 is essentially an enhanced 8×8 crossbar switch which works with a plurality of slots. In the preferred embodiment, eight slots are provided for each of a source B register 350, source A register 354 and a destination register 358. The source B register 350 is connected to a multiplexer 352. The output of the multiplexer 352 and the source A register 354 is provided to a VALU partition 356. The VALU partition 356 in turn is connected to the destination register 358.

In the vector source B register 350, each slot contains either one 20-bit partition or two 10-bit partitions, depending on the partition width as specified in the vector instruction. For 10-bit partitions, the MEU 320 simultaneously performs independent but identical operations on the two partitions in a slot. Furthermore, each slot in the destination register 358 can independently receive one of eleven values: the value in one of the eight source slots 350 and 354, a Z value (0), a P value (1) or an N value (−1). During the execution of codes by the MEU 320, all vector instructions use a single opcode format that simultaneously controls the VALU 342 and the ORU 346. This format is approximately eight bytes long. Each instruction encodes the two source registers, the destination register, the partition size, and the operations to be performed on each partition. In addition, each instruction encodes the ORU 346 routing settings for each of the eight slots. Normally, any two of the vector operations defined in the following table may be specified in a single vector instruction. Each slot can be arbitrarily assigned either of the two operations. The vector instructions offered by the MEU 320 is shown in Tables 1 and 2, as follows:

TABLE 1

Vector Operation Descriptions

| Category | Mnemonic | Description |
|---|---|---|
| Add | add add_ | Add sourceA and sourceB partitions, place sum in destination. add_ arithmetically shifts the result right by one bit (computes average). |
| Subtract | sub sub_ sbr sbr_ | Subtract partitions. sub does sourceA - source B; sbr does source B - source A. sub_and sbr_arithmetically shift the result right by one bit. |
| Accumulate /Merge | acum acum_ | Add the contents of the destination register partition to the sourceB partition and place the sum in the destination. acum_arithmetically shift the result right by one bit. |
| Negate | neg | Negate sourceB partition and place in destination. |
| Distance | dist | Subtract partitions then perform absolute value. |
| Multiply | mul mac | mul multiplies the sourceA partition by the sourceB partition and places the product in the destination. mac multiplies sourceA by source B and adds the product to the destination. |
| Conditional Move | mvz mvnz mvgez mvlz | Conditionally move partition in sourceB register to partition in destination register depending on sourceA partition's relationship to zero. |
| Scale | asr n asl n | Arithmetically shifts the operand in sourceB by amount n. N can be between 1 and 4 inclusive. asl uses saturating arithmetic and shifts zeros in from the right. asr copies the sign bit from the left. |
| Logical Shift | lsr n lsl n | Logically shifts the operand in sourceB by amount n. N can be between 1 and 4 inclusive. Zeros are shifted in from the left or right. lsl uses modulo arithmetic; it does not clip. |
| Boolean | false nor bnota nota anotb notb xor nand and nxor b borna a aornb or true | Perform one of sixteen possible Boolean operations between sourceA and sourceB partitions. (The operations are listed in order of their canonical truth table representations.) |
| Round | rnd n | Add the constant (1*LSb <<n−1) to sourceB, then zero out the n lowest bits. n can be between 1 and 4 inclusive. Implements "round-to-even" method: If (sourceB<n:0>==010...0), then don't do the add. |
| Magnitude Check | mag | This operation can be used to implement block floating point algorithms. If the number in sourceB has fewer consecutive leading 1's or 0's than the number in sourceA, then sourceB is placed in the destination; otherwise sourceA is placed in the destination. Only the eight leftmost bits of the values are used in the comparison; if both sourceA and sourceB start with a run of more than 7 bits, then the result is the value from sourceA. This operation is an approximation of the "C" statement: (abs(sourceA) <= abs(sourceB)) ? sourceA : source B. |
| SourceA Partition shift | pshra | For each slot s, copy the contents of slot s+1 from the sourceA register to slot s in the destination register. (If this operation is used in slot 7, then the result is immediate zero). This operation can be used to efficiently shift data inputs and outputs during convolutions (FIR filters, etc.). |
| Slot Routing | blbh ahbh albl | These operations are defined only for 20-bit partitions. They are used to route 10-bit data across the even/odd "boundary" that the ORU doesn't cross. blbh swaps the upper and lower halves of the sourceB operand and places the result in the destination. ahbh concatenates the upper half of the sourceA with the upper half of sourceB. albl concatenates the lower half of sourceA with the lower half of sourceB. |
| Store Conversion | ws2u | This operation is used prior to storing 16-bit unsigned data from a 20-bit partition. If bit 19 of sourceB is set, the destination is set to zero. Otherwise, this operation is the same as lsl 1. |
| Extended-Precision | emach emacl emaci carry | These operations are used to perform multiply-and-accumulate functions while retaining 36 bits of precision in intermediate results; they are only defined for 20-bit partitions. emach is the same as mac, except that no rounding is done on the LSb. emacl multiplies sourceA and sourceB, then adds bits <18:3> of the 39-bit intermediate product to bits <15:0> of the destination, propagating carries through bit 19 of the destination. emaci is similar to emacl, except that bits <9:16> of the destination are cleared prior to the summation. The carry operation logically shifts sourceB right by 16 bits, then adds the result to SourceA. |

TABLE 2

Operation Synonyms

| Category | Alias Name | Actual Operation | Description |
|---|---|---|---|
| Move SourceB | mov<br>mov__ | b<br>asrl | Move the sourceB register partition to the destination partition. mov__arithmetically shifts the results right by one bit. |
| Move SourceA | mova | a | Copy the partition in sourceA to the destination. |
| SourceA Absolute Value | absa | dist (..Z..) | Compute the absolute value of the sourceA partition. |
| Unmodified Destination | dest | acum (..Z..) | Leave the destination partition unchanged. |
| Average | avg | add__ | Compute average of two values. |

Turning now to load and store instructions, each type of operation has two versions: one that moves 16 bytes of memory and one that moves 8 bytes of memory. The 8-byte versions are defined because this is often the amount of data needed; loading or storing 16 bytes in these cases would be wasteful. Further, the 8-byte loads and stores can be used to convert between byte-precision data and word-precision data. The 16-byte loads and stores operate on the entire 160-bit vector register. The 8-byte stores for 20-bit partitions store only the values from slots 4 through 7. The 8-byte stores for 10-bit partitions store only the upper half of each of the eight slots. The 8-byte loads for 20-bit partitions load the memory data to slots 4 through 7; slots 0 through 3 are set to zero. The 8-byte loads for 10-bit partitions load the memory data to the upper half of each slot; the lower half of each slot is set to zero. Even though 8-byte loads only copy memory to half of the bits in a vector register, the entire 160-bit vector register is updated by padding the unused partitions with zeros. This feature greatly simplifies the implementation of register renaming for the MEU because partial register updates do not occur. Table 3 illustrates the load and store instructions in more detail:

The mnemonics for the vector instruction need to specify the operations to perform on each partition as well as the sources, destination and ORU routing. This is notated as follows:

{sbr sbr add add sbr add sbr add} word V3, V2, V1(37P3Z1N2)

This instruction performs adds and reverse subtracts. V3 is the destination; V2 is sourceA, V1 is sourceB. The slots for the operand specifier and the routing specifier are laid out in decreasing order from left to right.; slot 7 and 6 get sbr, slot 5 gets add, and so forth. The "word" symbol specifies that the instruction works on a 20-bit partitions. The routing specifier for sourceB is set for the following (the number after the points specify slot numbers):

dest.7<==–sourceA.7+sourceB.3
dest.6<==–sourceA.6+sourceB.7
dest.5<==sourceA.5+#1.0
dest.4<==sourceA.4+sourceB.3
dest.3<==–sourceA.3+#0.0
dest.2<==sourceA.2+sourceB.1
dest.1<==–sourceA.1+#–1.0

TABLE 3

Load and Store Instruction Descriptions

| Instruction Type | Mnemonic Format | Description |
|---|---|---|
| 16-Byte, 20-Bit Load | vldw vd, mem128 | Load destination register vd with 16 bytes of signed 16-bit data at address mem128. |
| 8-Byte, 20-Bit Load | vldw vdh, mem64 | Load slots 4 through 7 of destination register vd with 8 bytes of signed 16-bit data at address mem64. Set slots 0 through 3 of vd to zero. |
| 16-Byte, 10-Bit Load | vldb vd, mem128 | Load destination register vd with 16 bytes of unsigned 8-bit data at address mem128. Data is loaded using a 2:1 byte interleave pattern. |
| 16-Byte, 10-Bit Load | vldb vdh, mem64 | Load destination register vd with 8 bytes of unsigned 8-bit data at address mem64. The upper half of each slot receives the memory values; the lower half of each slot is set to zero. |
| 16-Byte, 20-Bit Store | vstw mem128, vs | Store source register vs to 16 bytes of signed 16-bit data at address mem128. |
| 8-Byte, 20-Bit Store | vstw mem64, vsh | Store slots 4 through 7 of source register vs to 8 bytes of signed 16-bit dat at address mem64. |
| 16-Byte, 10-Bit Store | vstb mem128, vs | Store source register vs to 16 bytes of unsigned 8-bit data at address mem128. Data is stored using a 2:1 interleave pattern. |
| 16-Byte, 10-Bit Store | vstb mem64, vsh | Store source register vs to 8 bytes of unsigned 8-bit data at address mem64. The upper half of each slot is stored to memory; the lower half of each slot is ignored. |

dest.0<==sourceA.0+sourceB.2

Figure 5:
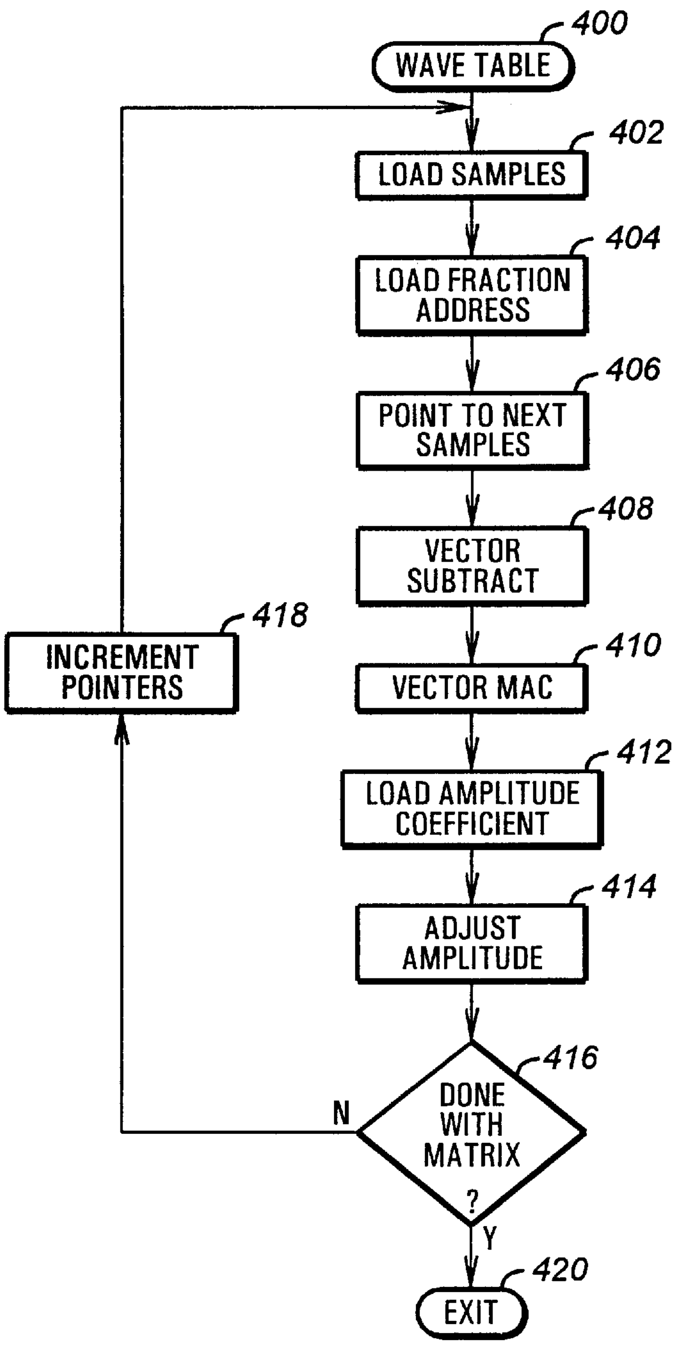
FIG. 5 is a flow chart of an inner loop for performing wavetable processing in accordance with the present invention.

Turning now to FIG. 5; wave table audio generation is disclosed. This technique is used to generate intermediate pitches between two wavetables. A number of different processes may be used to interpolate the sample values. The present invention applies a linear interpolation where the interpolated value is the weighted average of the two nearest samples, with the fractional address being used as a weighting constant. The present invention thus interpolates between two points A and B, with fractional value X, using the equation:

$$Vx=A+X(B-A)$$

The interpolation process is shown in more detail in FIG. 5. As shown therein, from step 400, the routine loads data samples into vector registers V0, V1 and V2 in step 402. back to step 402 to continue processing data. Alternatively, from step 416, the routine of FIG. 5 exits in step 420.

The code to control the vector operations in the MEU of the present invention thus implements the equation:

$$Vx=V0+x(VI-V0)=A+X(B-A)$$

Furthermore, the code is listed and its operation is illustrated in more detail in Table 4 below. In this code, edx=points to a buffer holding samples which are arranged as A×B×, where A is the low value, B is the high value, ebp=points to a buffer holding fractional addresses, and ebx=points to output buffer

TABLE 4

| | |
|---|---|
| a vldw v2, [edx] | ;load samples<br>;v2 = A3B3A1B2A1B1A0B0 |
| b {mov,mov,mov,mov,mov,mov,mov,mov}word v0, v2, v2 (64207531) | ;v0 = B3B2B1B0A3A2A1A0 |
| c vldw v1, [edx+16] | ;load more samples<br>;v1 = A7B7A6B6A5B5A4B4 |
| d {mov,mov,mov,mov,mov,mov,mov,mov}word v1,v1,v1 (64207531) | ;v1 = B7B6B5B4A7A6A5A4 |
| e vldw v3,[edp] | ;load fractional addresses<br>;v3 = X7X6X5X4X3X2X1X0 |
| f add edx,32 | ;increment edx to point to next samples |
| g {movb,movb,movb,movb,mova,mova,mova,mova}word v2, V0, v1 (3210ZZZZ) | ;v2 = A7A6A5A4A3A2A1A0 |
| h {mova,mova,mova,mova,movb,movb,movb,movb}work v1,v1,v0 (ZZZZ7654) | ;v1 = B7B6B5B4B3B2B1B0 |
| i {sub,sub,sub,sub,sub,sub,sub,sub}word v1,v1,v2 (76543210) | ;v1 = (B7−A7−..(B0−A0) |
| j {mac,mac,mac,mac,mac,mac,mac,mac}word v2,v3,v1 (76543210) | ;v2 = (A7+X7(B7−A7))..(A0+X0(B0−A0)) |
| ;now adjust amplitude | |
| ; edi = address of amplitude control (single constant) | |
| k vldw v0,[edi] | ;get amplitude control in lowest word |
| l {mul,mul,mul,mul,mul,mul,mul,mul}word v2,v2,v0 (00000000) | ;v2 - oldv2*amplitude |
| m vstw [ebx],v2 | ;store results |
| n add cbx,32 | ;increment pointers |
| o add cbp,16 | ;increment pointers |

Preferably, the data is retrieved from a circular buffer. Next, the routine 400 loads the fractional portion of the addresses between two samples into a vector register V3 in step 404. From step 404, the routine points to the next data samples in step 406 in preparation for computations in the next loop.

Once the data has been loaded into the vector registers V0–V3, a vector subtraction is performed on vector registers VI and V2 in step 408 to compute A–B. Next, a vector multiply accumulate (MAC) operation is performed in step 410 using vector registers V1, V2 and V3 to generate data corresponding to A+X(B–A). Thus, after step 410, the vector register V2 contains a vector of the interpolated values.

Next, the vector of interpolated values is scaled with respect to the loudness. Thus, from step 410, the routine loads an amplitude coefficient into the lowest slot of the vector register V0 in step 412. From step 412, the routine of FIG. 5 performs an amplitude adjustment in step 414 by multiplying the amplitude coefficient with the vector of interpolated values. Thus, after step 414, the sound amplitude has been interpolated and scaled.

Figure 6:
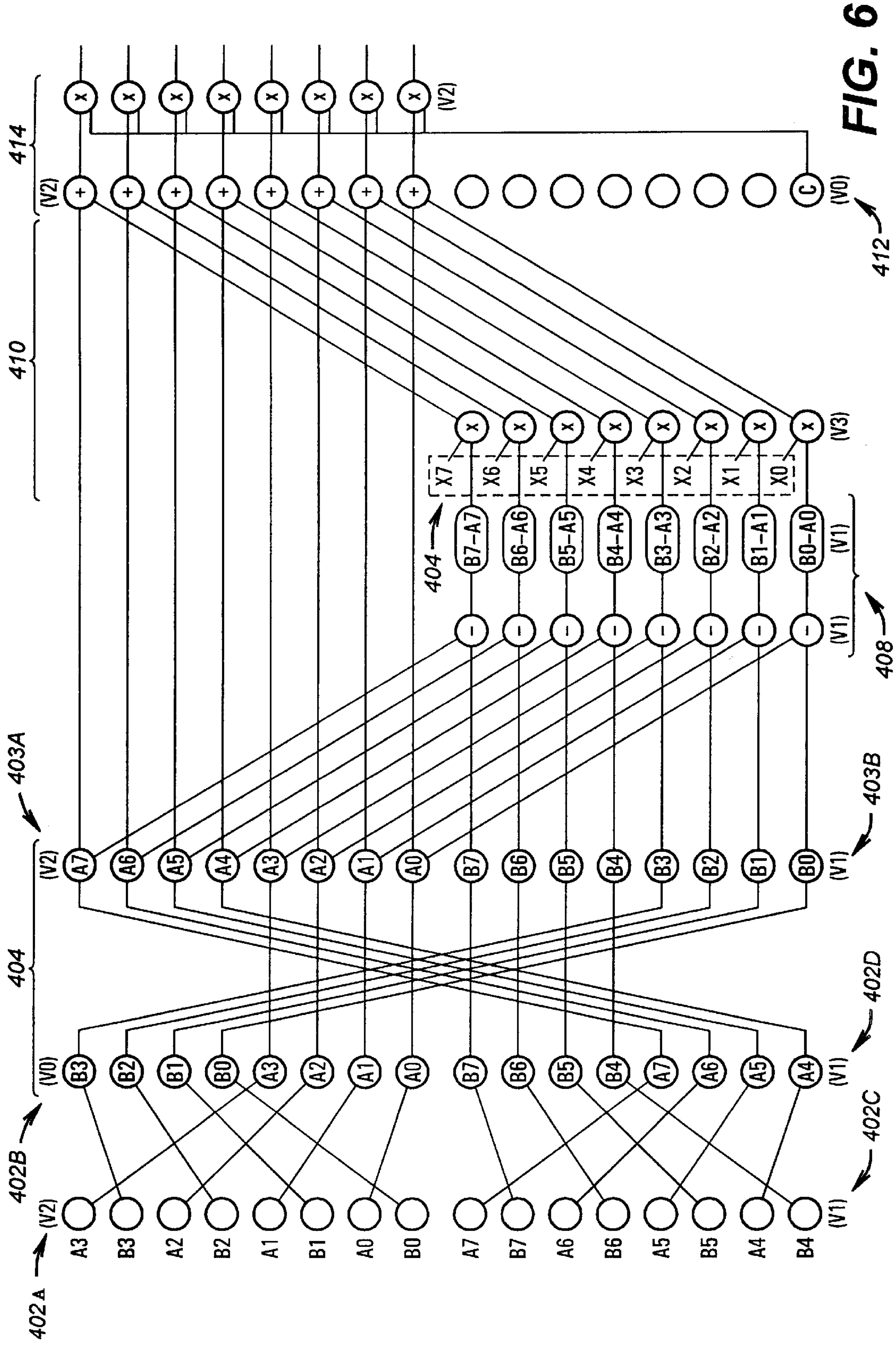
FIG. 6 is a flow diagram illustrating the wavetable processing of FIG. 5 on a multimedia extension unit (MEU) according to the present invention.

From step 414, the routine checks if it is done with all the data in the matrix in step 416. If not, the appropriate data pointers are updated in step 418 before the routine loops Turning now to FIG. 6, the flow diagram illustrating the power of implementation wavetable interpolation on an MEU according to the present invention is disclosed. FIG. 6 illustrates in detail the inner loop of the wave table processing routine of FIG. 5. In FIG. 6, the vector register V2 is loaded with the respective data A3, B3, A2, B2, A1, B1, A0, B0 in step 402A (instruction a of Table 4). Similarly, the data A7, B7, A6, B6, A5, B5, A4 and B4 are loaded to the vector register V1 in step 402C (instruction c of Table 4). In step 402B (instruction b) and step 402D (instruction d), the data values are realigned into the sequence B3 . . . B0, A3 . . . A0, B7 . . . B4, and A7 . . . A4, respectively. Next, in step 403A(instruction a) and step 403B (instruction h), the data values are further aligned such that the A data values are stored in the vector register V2 and the B data values are stored in the vector register V1. Thus, the scrambled data input is remapped into the respective A and B sequence in four vector realignment operations. After steps 403A and 403B, the routine of FIG. 6 loads the fractional address data values in vector register V3 in step 404 (instruction e) in preparation for a multiply-accumulate operation to be performed soon.

Next, in step 408 (instruction i), a vector subtraction operation is performed to generate the intermediate result B7–A7, B6–A6, B5–A5, B4–A4, B3–A3, B2–A2, B1–A1, and B0–A0 in vector register V1. From step 408, a vector multiply accumulate operation is performed in step 410 (instruction j) on the results generated by step 408 and the fractional address loaded in vector register V3 in step 404. Thus, steps 408 and 410 perform the interpolation on eight data values using essentially two vector operations, not counting the overhead to load and realign the data.

Furthermore, a scaling operation is performed in step 412 and step 414. First, a scaling constant is loaded into the bottom-most slot of the vector register V0 in step 412 (instruction k). Next, the constant is multiplied with the vector register V2 holding the results of the multiply accumulate operation of step 410 to arrive at a scaled amplitude value in step 414 (instruction l). At this point, the routine countinues with step 416 of FIG. 5.

In sum, the wavetable interpolation routine of FIGS. 5–6 requires only 4 loads, 7 vector operations (2 muls), 1 store operation and integer operations. Furthermore, with each 2 clock multiply operation, the code of FIGS. 5–6 obtains a 9 clock throughput.

Figure 7:
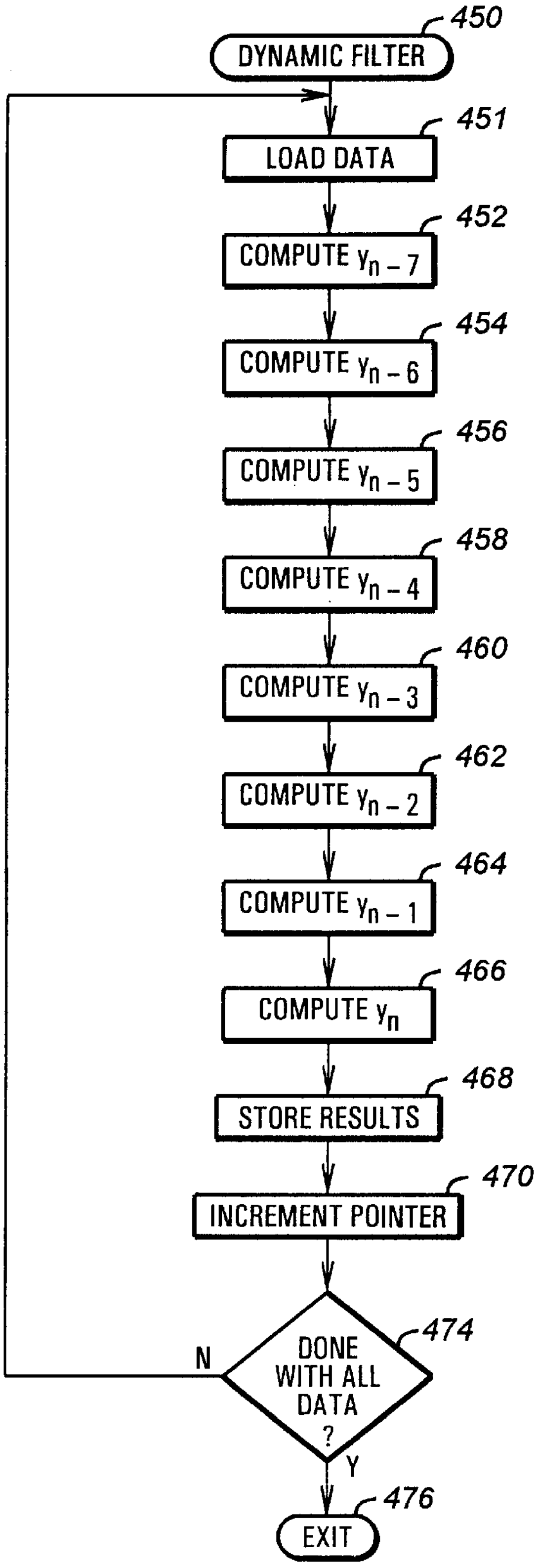
FIG. 7 is a flow chart of an inner loop for performing dynamic filtering in accordance with the present invention.

Turning now to FIG. 7, the process for performing dynamic filtering is disclosed. Dynamic filtering is used to add complexity and realism to the timbre of a sound. The routine of FIG. 7 implements the equation $y_n=x_n+gy_{n-1}$. From step 450, the routine of FIG. 7 computes $Y_{n-7}$ in step 452. From step 452, the routine then computes $Y_{n-6}$ in step 454. Continuing along the series, the routine computes $Y_{n-5}$ in step 456, $Y_{n-4}$ in step 458, $Y_{n-3}$ in step 460, $Y_{n-2}$ in step 462, $Y_{n-1}$ in step 464, and finally $Y_n$ in step 466. These results are stored in step 468 before the pointer is incremented in step 470, and new data is retrieved in step 472. From step 472, the routine checks to see if all data has been computed in step 474. If not, the routine loops back to step 452 to continue the dynamic filtering process on the next batch of data. Alternatively, in the event that the dynamic filtering operation has been performed on all data in step 474, the routine of FIG. 7 simply exits in step 476. In FIG. 7, the initial data arrays are:

V0=[xF xE xD xC xB xA x9 x8]

V1=[y7 y6 y5 y4 y3 y2 y1 y0]

where v0 represent the input values (x), v1 represents the output values (y), and U2 represents the filter constants GGGGGGGG. The code for the dynamic filtering routine of FIG. 7 is shown in more detail in Table 5:

TABLE 5

```
repeat_loop:
    {acum,acum,acum,acum,acum,acum,acum,mac}word v0,v2,v1(ZZZZZZZF)
                                                        ;v0=[xFxExDxCxBxAx9y8]
    {acum,acum,acum,acum,acum,acum,mac,acum}word v0,v2,v0(ZZZZZZOZ)
                                                        ;v0=[xFxExDxCxBxAy9y8]
    {acum,acum,acum,acum,acum,mac,acum,acum}word v0,v2,v0(ZZZZZ1ZZ)
                                                        ;v0=[xFxExDxCxByAy9y8]
    {acum,acum,acum,acum,mac,acum,acum,acum}word v0,v2,v0(ZZZZ2ZZZ)
                                                        ;v0=[xFxExDxCyByAy9y8]
    {acum,acum,acum,mac,acum,acum,acum,acum}word v0,v2,v0(ZZZ3ZZZZ)
                                                        ;v0=[xFxExDyCyByAy9y8]
    {acum,acum,mac,acum,acum,acum,acum,acum"workv0,v2,v0(ZZ4ZZZZZ)
                                                        ;v0=[xFxExDyCyByAy9y8]
    {acum,mac,acum,acum,acum,acum,acum,acum}word v0,v2,v0(Z5ZZZZZZ)
                                                        ;v0=[xFyEyDyCyByAy9y8]
    {mac,acum,acum,acum,acum,acum,acum,acum}word v0,v2,v0(6ZZZZZZZ)
                                                        ;v0=[yFyEyDyCyByAy9y8]
    {mov,mov,mov,mov,mov,mov,mov,mov}word v1,v0,v0(76543210)
                                                        ;v1=[yFyEyDyCyBAy9y8]
    vstw [ebx],v0                                       ;store results over old data imput
    add ebx,16                                          ;increment pointer
    vldw v0,[ebx]                                       ;get new data
    dec ecx                                             ;decrement loop counter
    loop repeat_loop
```

Figure 8:
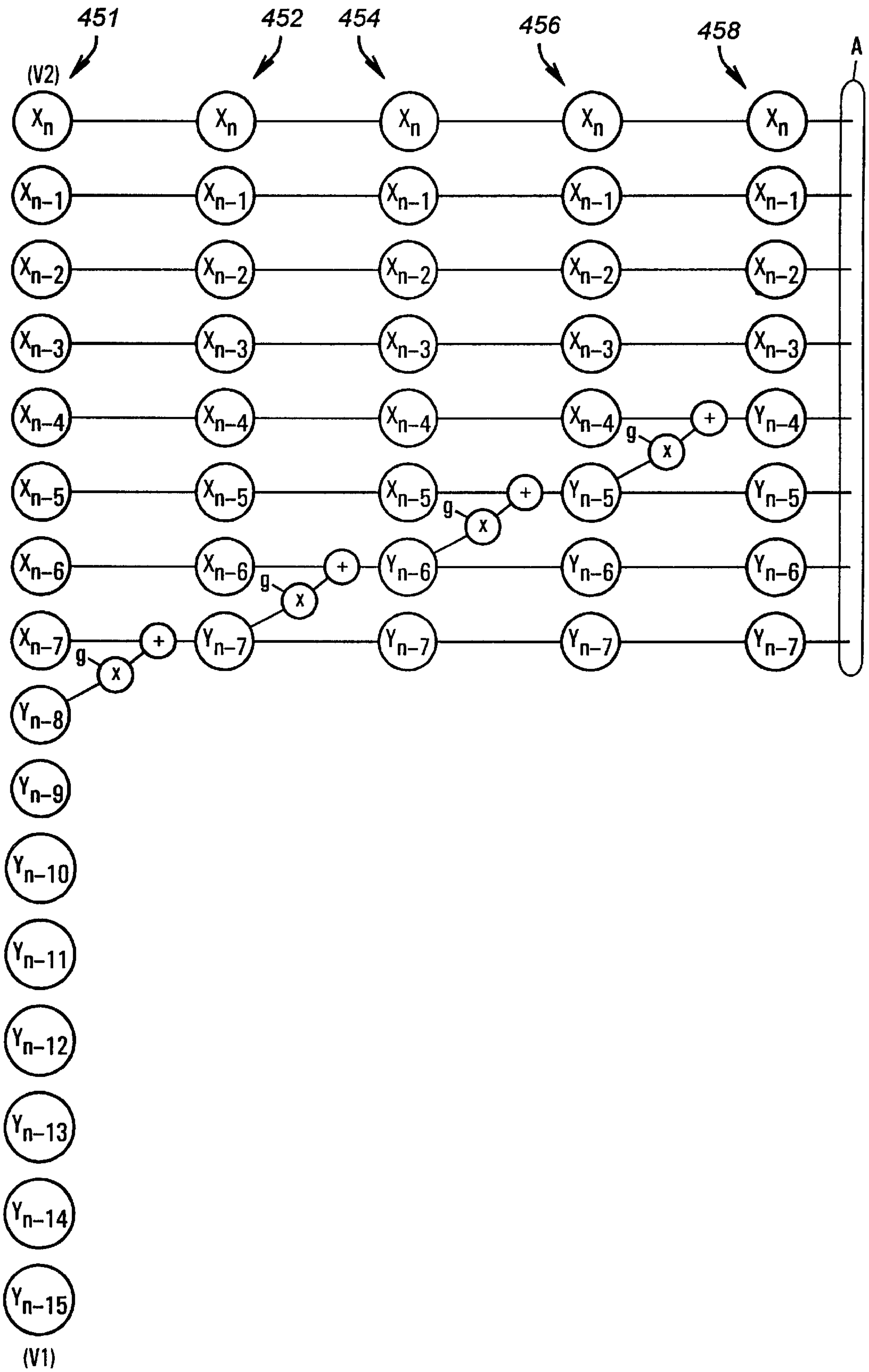
FIG. 8 is a flow diagram illustrating the dynamic filtering of FIG. 7 on the MEU according to the present invention.

Returning now to FIGS. 8 and 9, the corresponding operation on the MEU hardware is illustrated. In FIG. 8, the data $X_n..X_{n-7}$ is loaded in vector register V2 in step 451, while the previous values of $Y_{n-8}..Y_{n-15}$ are already computed and stored in the vector register V1. Furthermore, the constant G is already stored and ready for performing the various multiply accumulate operations. In step 452; a multiply and accumulate operation is performed where $Y_{n-8}$ is multiplied with G and, in the same instruction, the result is accumulated in slot zero that contained $X_{n-7}$ to produce $Y_{n-7}$. This result is stored to stored slot zero of the vector register V2. However, the remaining slots 1–7 of the vector register maintain their data in step 452.

This process is repeated in step 454 with another multiply and accumulate operation being performed, where $Y_{n-7}$ is multiplied with G and, in the same instruction, the result is accumulated in slot one that contained $X_{n-6}$ to produce $Y_{n-6}$. This result is stored in slot one of the vector register V2. Thus, the vector register V2 now contains $X_n..X_{n-5}$, $Y_{n-6}$, $Y_{n-7}$. In step 456, the multiply and accumulate operation of the previous step is repeated once more where $Y_{n-6}$ is multiplied with G and, in the same instruction, the result is accumulated in slot two that contained $Y_{n-5}$ to produce $Y_{n-5}$.This result is stored in slot two of the vector register V2. Thus, the vector register V2 now contains $X_n..X_{n-4}$, $Y_{n-5}$, $Y_{n-6}$, $Y_{n-7}$ in step 456.

Similarly, in step 458, the multiply and accumulate operation is performed where $Y_{n-5}$ is multiplied with G and, in the same instruction, the result is accumulated in slot one that contained $X_{n-4}$ to produce $Y_{n-4}$. This result is stored in slot three of the vector register V2. Thus, the vector register V2 now contains a vector comprising $X_n$, $Y_{n-1}$, $X_{n-2}$, $X_{n-3}$, $Y_{n-4}$, $Y_{n-5}$, $Y_{n-6}$, $Y_{n-7}$. The result of this vector is then denoted as vector A in FIG. 8.

Figure 9:
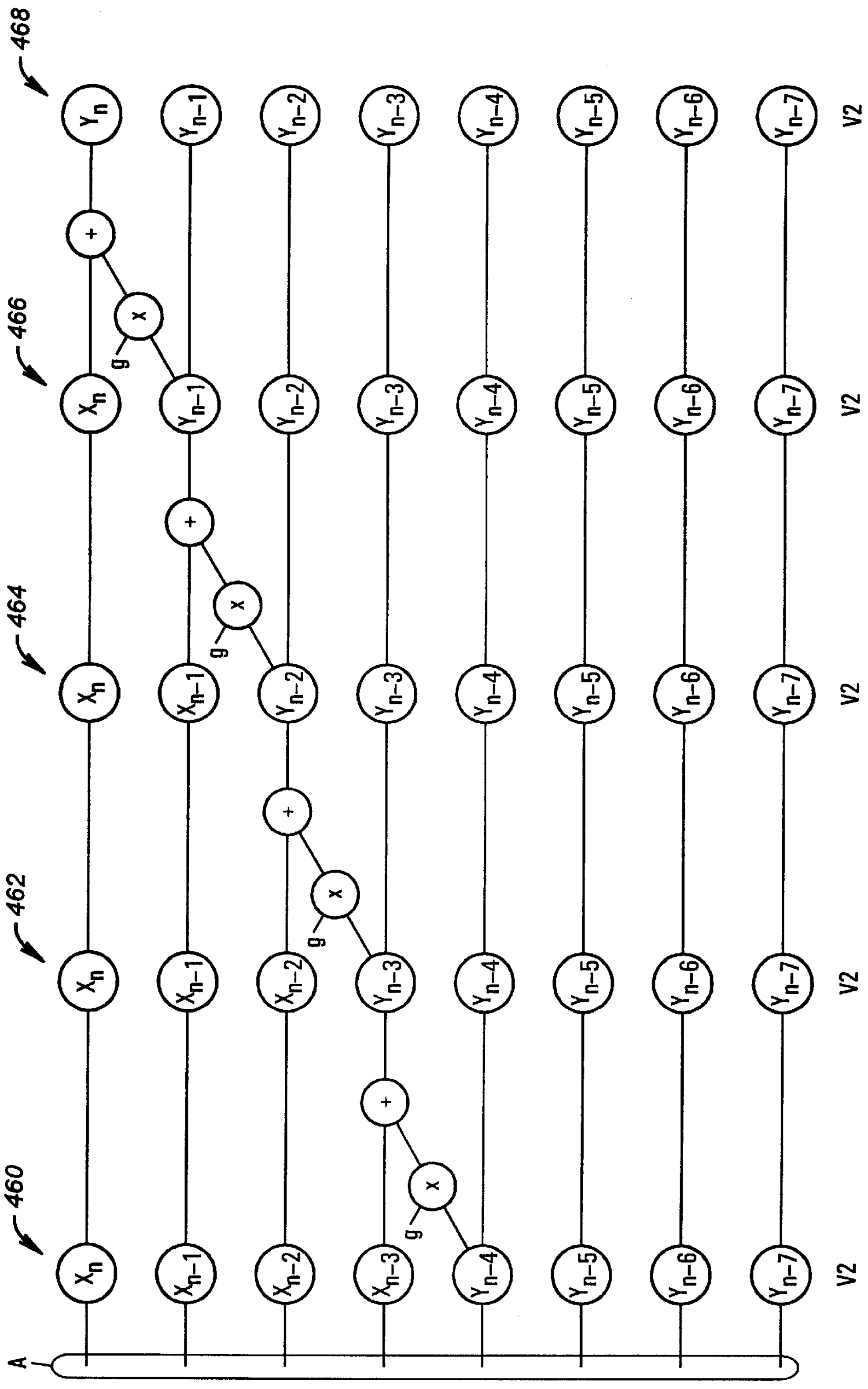
FIG. 9 is a continuing flow diagram illustrating the dynamic filtering of FIG. 7 on the MEU according to the present invention.

The processing of the vector result marked as A in FIG. 8 is continued in FIG. 9. In FIG. 9, in step 460, a multiply and accumulate operation is performed where $Y_{n-4}$ is multiplied with G and, in the same instruction, the result is accumulated in slot one that contained $X_{n-3}$ to produce $Y_{n-3}$ This result is stored in slot four of the vector register V2. Thus, the vector register V2 now contains $X_n$, $X_{n-1}$, $x_{n-2}$, $Y_{n-3}$..$Y_{n-7}$. This process is repeated in steps 464, 466, and 468 where the vector register V2 contains the value $Y_n$..$Y_{n-7}$ when the flow diagram of FIG. 9 is completed.

Figure 10:
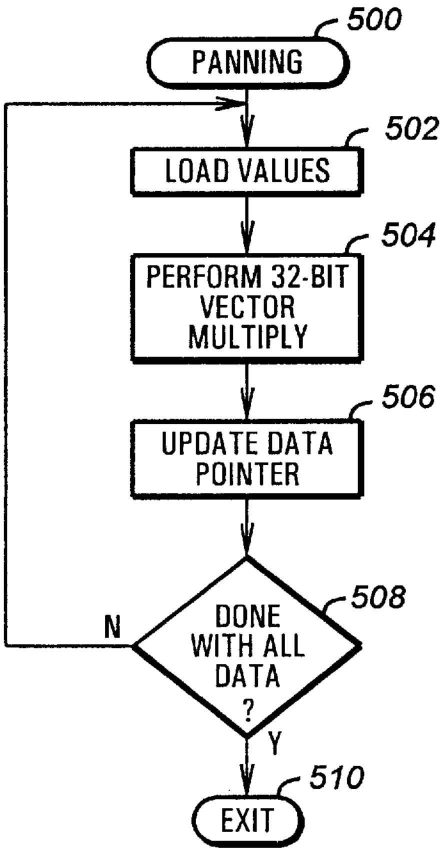
FIG. 10 is a flow chart of an inner loop for performing audio panning in accordance with the present invention.

It is sometimes desirable to take an original monaural audio segment and generate a binaural audio segment from such in order to effect a more pleasing stereo audio in the multimedia computer system of the present invention. Such splitting of monaural sound is typically called panning, where the monaural audio data is multiplied using predetermined coefficients to achieve the differential sound effect typically associated with stereo and other surround sound systems. Turning now to FIG. 10, the operation of a panning operation is shown in more detail. In FIG. 10, from step 500, the routine loads the monaural data values into vector registers V0 and V1 in step 502. Next, the routine performs a 32-bit vector multiplication using two sets of coefficients, one for the right channel and one for the left channel in step 504, to scale the data for the appropriate stereo effect. From step 504, the routine updates the respective data pointers in step 506. Next, the routine of FIG. 10 checks if it has completed processing all data for the audio segment array in step 508. If not, the routine of FIG. 10 loops back to step 502 where it loads the next data values in the audio segment array and continues the panning operation. From step 508, in the event that all audio data in the input array have been processed, the routine of FIG. 10 exits in step 510.

The code to instruct the MEU to efficiently perform the panning operation for each channel is disclosed below in Table 7:

TABLE 7

```
Panning
v0 = input values
v1 - gain control (l and r)
v2 - low sum
v3 = high sum
   vlds v0,[ edi] ;get values from array
   {emacl,emacl,emacl,emacl,emacl,emacl,emacl,emacl}v2,v1,v0(76543210)
   {emach,emach,emach,emach,emach,emach,emach,emach}v3,v1,v0(76543210)
```

Figure 11:
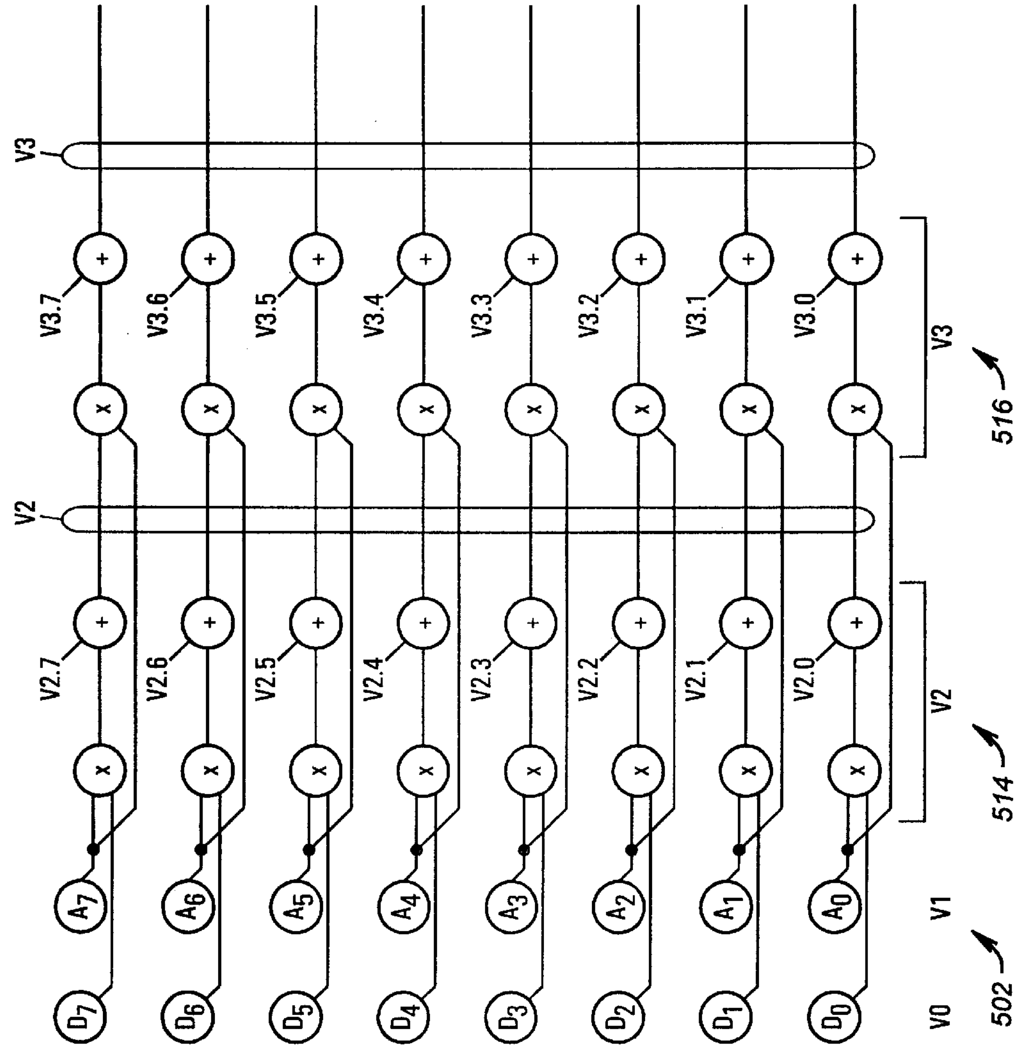
FIG. 11 is a flow diagram illustrating the panning operation of FIG. 2 on the MEU according to the present invention.

Turning now to FIG. 11, a flow chart of the MEU operation in accordance with the above code segment is disclosed in more detail. In step 502, the respective data values are loaded into vector registers V0 and V1. Next, in step 514, an extended multiply and accumulate operation is performed on the low order words of the 32-bit precision multiply operation. In step 516, a multiply and accumulate operation is performed on the high order word of the operands. In combination, the multiply and accumulate operation on the low order and the high order words of steps 514 and 516 provide 32-bit results, as stored in vector registers V2 and V3 for increased precision. Although the 32-bit precision is ultimately not necessary, 32-bit precision results allow additional calculations to be performed while minimizing the accumulation of errors.

In summary, the present invention illustrates an apparatus and a method for massaging audio signal by performing interpolation, dynamic filtering, stretching and panning on audio signal represented as a matrix of input values. In the interpolation process, the input values are loaded into first and second vector registers, while fractional coefficients are loaded into a third vector register. Next, the first vector register is subtracted from the second vector register. Additionally, in a single operation, the routine performs a vector multiply operation between the second and third registers and accumulates the result of the vector multiply operation in the second register. The results are saved and the process is repeated until all input values in the matrix have been processed.

In the dynamic filtering process, after the data loading step, for each slot in said vector register, the routine performs a multiply operation between the filter coefficient and the slot of the vector register and accumulates the result of the multiply operation in the slot of the second register in a single clock cycle while it retains data of the remaining slots in the vector register in the same clock cycle. The results are saved and the process is repeated until all input values in the matrix have been processed.

In the panning process, the routine performs a vector multiply operation between the first vector register and a coefficient vector register for each slot in the first vector register. This vector multiply operation is preferably a 32-bit vector multiply operation which is broken down into a low order extended precision multiply accumulate operation and a high order extended precision multiply accumulate operation. The results are saved and the operation is repeated until all input values in the matrix have been processed.

Thus, the present invention provides a fast and efficient apparatus and method for performing various digital audio processing on a general purpose processor. Furthermore, the present invention allows a real-time processing of the audio signal without adversely affecting the compatibility of the personal computer with the installed software base.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for interpolating an audio signal represented as an array of input values using an array of fractional coefficients on a processor with a multimedia extension unit providing operand routing and slot selectable operations, said method comprising the steps of:

(a) loading said input values into first and second vector registers and fractional coefficients into a third vector register;

(b) subtracting the first vector register from the second vector register, wherein the result is stored in said second vector register;

(c) in a single operation, performing a vector multiply operation between said second and third vector registers and accumulating the result of the vector multiply operation in said second vector register;

(d) saving the result of step (c); and (e) repeating steps (a) through (d) until said all input values in said array have been processed.

2. The method of claim 1, wherein said loading step loads low audio inputs into said first vector register and high audio inputs into said second vector register.

3. The method of claim 1, further comprising the step of performing a vector multiply operation between an amplitude adjustment constant and said second vector register to adjust the amplitude of the audio signal.

4. The method of claim 1, further comprising the step of performing a data alignment operation on the first and second vector registers.

5. A method for dynamically filtering an audio signal represented as an array of input values using a filter coefficient on a processor with a multimedia extension unit providing operand routing and slot selectable operations, said method comprising the steps of:

(a) loading said input values into a vector register;

(b) for each slot in said vector register:

performing a multiply operation between said filter coefficient and said slot of said vector register and accumulating the result of the multiply operation in said slot of said vector register in a single clock cycle; and retaining the data of the remaining slots in said vector register in the same clock cycle;

(c) saving the result of step (b); and (d) repeating steps (a) through (c) until said all input values in said array have been processed.

6. The method of claim 5, wherein step (b) is performed eight times on each slot of said vector register.

7. The method of claim 5, wherein said coefficient is stored in one slot of another vector register.

8. A method for panning an audio signal represented as an array of input values using an array of panning coefficients stored in a coefficient vector register on a multimedia extension unit providing operand routing and slot selectable operations, said method comprising the steps of:

(a) loading said input values into a first vector register;

(b) for each slot in said first vector register, performing a multiply operation between said first vector register and said coefficient vector register; and (c) saving the result of step (b); and (d) repeating steps (a) through (c) until said all input values in said array have been processed.

9. The method of claim 8, wherein said multiply operation is a 16-bit multiply operation with a 32-bit result, further comprising the steps of (d) performing a low word extended precision multiply accumulate operation on the said first vector register; and (e) performing a high word extended precision multiply accumulate operation between said first vector register and a second vector register and storing the result in said second vector register.

10. A computer system for interpolating an audio signal, the system comprising:

a vector processing unit with vector operand routing and multiple operations per instruction;

first means for loading said input values into first and second vector registers and fractional coefficients into a third vector register;

second means for subtracting the first vector register from the second vector register wherein the result is stored in said second vector register;

third means for, in a single operation, performing a vector multiply operation between said second and third vector registers and accumulating the result of the vector multiply operation in said second vector register;

fourth means for saving the result of third means; and fifth means for repeating first through fourth means until said input values in said array have been processed.

11. A computer program product for controlling a vector processing unit, the program comprising:

a computer readable medium;

first means on said computer readable medium for loading said input values into first and second vector registers and fractional coefficients into a third vector register;

second means on said computer readable medium for subtracting the first vector register from the second vector register, wherein the result is stored in said second vector register;

third means on said computer readable medium for, in a single operation performing a vector multiply operation between said second and third vector registers and accumulating the result of the vector multiply operation in said second vector register;

fourth means on said computer readable medium for saving the result of third means; and fifth means on said computer readable medium for repeating first through fourth means until said input values in said array have been processed.

12. A system for interpolating an audio signal represented as an array of input values in an audio system comprising:

a processor;

a multimedia extension unit coupled to the processor having operand routing and operation selection;

an audio system; and a code segment for execution by said processor and said multimedia extension unit, said code segment including:

(a) code for loading said input values into first and second vector registers and fractional coefficients into a third vector register;

(b) code for subtracting the first vector register from the second vector register, wherein the result is stored in said second vector register;

(c) code for, in a single operation, performing a vector multiply operation between said second and third vector registers and accumulating the result of the vector multiply operation in said second vector register;

(d) code for saving the result of code segment (c); and (e) code for repeating code segments (a) through (d) until said all input values in said array have been processed.

13. A computer system for dynamically filtering an audio signal represented as an array of input values, the system comprising:

a vector processing unit with vector operand routing and multiple operations per instruction;

first means for loading said input values into a vector register;

second means for in each slot in said vector register, having:

means for performing a multiply operation between a filter coefficient and said slot of said vector register and accumulating the result of the multiply operation in said slot of said vector register in a single clock cycle; and means for retaining the data of the remaining slots in said vector register in the same clock cycle;

third means for saving the result of said second means; and fourth means for repeating said first through third means until said all input values in said array have been processed.

14. A computer program product for controlling a vector processing unit, the program comprising:

a computer readable medium;

first means on said computer readable medium for loading said input values into a vector register;

second means on said computer readable medium for, in each slot in said vector register performing a multiply operation between a filter coefficient and said slot of said vector register and accumulating the result of the multiply operation in said slot of said vector register in a single clock cycle and for retaining the data of the remaining slots in said vector register in the same clock cycle;

third means on said computer readable medium for saving the result of said second means; and fourth means on said computer readable medium for repeating said first through third means until said all input values in said array have been processed.

15. A system for dynamically filtering an audio signal in an audio system comprising:

a processor;

a multimedia extension unit coupled to the processor having operand routing and operation selection;

an audio system; and a code segment for execution by said processor and said multimedia extension unit, said code segment including:

(a) code segment for loading said input values into a vector register;

(b) a code segment for, in each slot in said vector register, performing a multiply operation between a filter coefficient and said slot of said vector register and accumulating the result of the multiply operation in said slot of said vector register in a single clock cycle, and retaining the data of the remaining slots in said vector register in the same clock cycle;

(c) code segment for saving the result of code segment (b); and (d) code segment for repeating code segments (a) through (c) until said all input values in said array have been processed.

16. A computer system for panning an audio signal, the system comprising:

a vector processing unit with vector operand routing and multiple operations per instruction;

first means for loading said input values into a first vector register;

second means having for each slot in said first vector register, means for performing a multiply operation between said first vector register and a coefficient vector register;

third means for saving the result of said second means; and fourth means for repeating said first through third means until said all input values in said array have been processed.

17. A computer program product for controlling a vector processing unit, the program comprising:

a computer readable medium;

first means on said computer readable medium for loading said input values into a first vector register;

second means on said computer readable medium for, in each slot in said first vector register, performing a multiply operation between said first vector register and a coefficient vector register;

third means on said computer readable medium for saving the result of said second means; and fourth means on said computer readable medium for repeating said first through third means until said all input values in said array have been processed.

18. A system for interpolating an audio signal in an audio system comprising:

a processor;

a multimedia extension unit coupled to the processor having operand routing and operation selection;

an audio system; and a code segment for execution by said processor and said multimedia extension unit, said code segment including:

(a) code segment loading said input values into a first vector register;

(b) code segment having for, in each slot in said first vector register, performing a multiply operation between said first vector register and a coefficient vector register;

(c) code segment for saving the result of code segment (b); and (d) code segment for means for repeating code segments (a) through (c) until said all input values in said array have been processed.

* * * * *